United States Patent
Nakagawa

[11] 3,844,640
[45] Oct. 29, 1974

[54] LARGE-APERTURE WIDE-ANGLE PHOTOGRAPHIC LENS SYSTEM

[75] Inventor: Jihei Nakagawa, Tokyo, Japan

[73] Assignee: Olympus Optical Co., Ltd., Tokyo-To, Japan

[22] Filed: Nov. 22, 1972

[21] Appl. No.: 308,786

[30] Foreign Application Priority Data
May 22, 1972  Japan................................ 47-50480

[52] U.S. Cl.................................. 350/214, 350/176
[51] Int. Cl............................................... G02b 9/64
[58] Field of Search............................ 350/214, 215

[56] References Cited
UNITED STATES PATENTS
3,506,339   4/1970   Kazamaki.................... 350/215 X
FOREIGN PATENTS OR APPLICATIONS
1,034,458   6/1966   Great Britain..................... 350/215

*Primary Examiner*—John K. Corbin
*Attorney, Agent, or Firm*—Cushman, Darby & Cushman

[57] ABSTRACT

The present invention relates to photographic lens systems and more particularly, to large-aperture wide-angle photographic lens systems. The lens system of the present invention consists of seven lenses. The first lens is a positive meniscus lens with its convex surface positioned on the object side, the second lens is a negative meniscus lens with its convex surface on the object side, the third lens is negative, the fourth lens is a cemented positive lens, the fifth lens is negative, the sixth lens is a positive meniscus lens with its convex surface on the image side and the seventh lens is positive. The lens system of the present invention has the feature to fulfill the following conditions. i. $f < f_1 < 2f$ ii. $0.8f < |f_2| < 1.2f$ iii. $0.2f < r_4 < 0.4f$ iv. $0.15f < d_5 + d_7 + d_8 < 0.3f$ v. $1.5f < f_{3,4} < 2.5f$ vi. $0.5f < r_6, r_7 < f$ vii. $d_{11} < 0.1f$ In the above, $f$ represents the focal length of the lens system as a whole, $f_1$ and $f_2$ represent focal lengths of the first and second lenses respectively, $f_{3,4}$ represents the total focal length of the third and fourth lenses, $r_1$ through $r_{15}$ represent radii of curvature of successive lenses and $d_1$ through $d_{14}$ represent thicknesses of successive lenses and distances between lenses on the axis.

1 Claim, 4 Drawing Figures

PATENTED OCT 29 1974 3,844,640

SPHERICAL
ABERRATION

ASTIGMATISM

DISTORTION

LARGE-APERTURE WIDE-ANGLE PHOTOGRAPHIC LENS SYSTEM

BACKGROUND OF THE INVENTION

The present invention relates to photographic lens systems and more particularly, to large-aperture wide-angle photographic lens system.

SUMMARY OF THE INVENTION

It is an object of the present invention to provide a photographic lens system with a long back focal length, large aperture ratio and wide field angle.

Another object of the present invention is to provide a compactly composed large-aperture wide-angle photographic lens system.

Still another object of the present invention is to provide a large-aperture photographic lens system for which various aberrations, especially, distortion and aberration of magnification are corrected favourably.

The large-aperture wide-angle photographic lens system of the present invention consists of the following seven lenses, i.e., the first lens is a positive meniscus lens with its convex surface positioned on the object side, the second lens is a negative meniscus lens with its convex surface on the object side, the third lens is negative, the fourth lens is a cemented positive lens, the fifth lens is negative, the sixth lens is a positive meniscus lens with its convex surface on the image side and the seventh lens is positive, and moreover, the lens system satisfies the following conditions.

i. $f < f_1 < 2f$
ii. $0.8f < |f_2| < 1.2f$
iii. $0.2f < r_4 < 0.4f$
iv. $0.15f < d_5 + d_7 + d_8 < 0.3f$
v. $1.5f < f_{3,4} < 2.5f$
vi. $0.5f < r_6, r_7 < f$
vii. $d_{11} < 0.1f$ In the above, $f$ represents the focal length of the lens system as a whole, $f_1$ and $f_2$ represent focal lengths of the first and second lenses respectively, $f_{3,4}$ represents the total focal length of the third and fourth lenses, $r_1$ through $r_{15}$ represent radii of curvature of successive lenses and $d_1$ through $d_{14}$ represent thicknesses of successive lenses and distances between lenses on the axis.

More detailed features of the above-mentioned photographic lens system of the invention are described in the following. The reason why a positive meniscus lens is adopted as the first lens and its focal length $f_1$ is selected to satisfy the condition ($i$) is that it is effective for correction of the distortion and aberration of magnification which are important problems regarding wide-angle lens systems. If $f_1$ does not satisfy the condition ($i$), i.e., if $f_1$ is smaller than the focal length of the whole lens system, it is difficult to make the back focal length of the lens system long. If $f_1$ is larger than $2f$, the effect to correct the distortion and aberration of magnification becomes insufficient. Besides, a negative meniscus lens is adopted as the second lens and its focal length $f_2$ is selected so that the condition (ii), i.e., $0.8f < |f_2| < 1.2f$ is satisfied. Moreover, the radius of curvature $r_4$ of the concave surface of the second lens is selected within the range of $0.2f < r_4 < 0.4f$ according to the condition (iii). These are essential to make the back focal lenth of the lens system long and to make Petzval's sum small, thus to make the lens system applicable to a wide field angle. If $|f_2|$ does not satisfy the condition (ii), that is, if $|f_2|$ is smaller than $0.8f$, stronger positive power is required for the lenses behind the second lens, i.e., the third lens through the seventh lens and, as a result, it becomes difficult to correct aberrations and to obtain a favourable image. Especially, it becomes difficult to correct the coma. Besides, when $|f_2|$ is larger than $1.2f$, a sufficient back focal length cannot be obtained unless the airspace between the second and third lenses is large. This is undesirable for making the lens system compact. If $r_4$ does not satisfy the condition (iii), i.e., $0.2f < r_4 < 0.4f$, it becomes difficult to correct the spherical aberration and coma. Further, the third lens is negative, the fourth lens is positive and these lenses are arranged providing a small, layer-like airspace and satisfying three conditions, (iv), (v) and (vi). This is effective for correcting the astigmatism and coma. The reason why a cemented lens is used as the fourth lens is that it is effective to achieve favourable correction of the chromatic aberration. If the third and fourth lenses do not satisfy the condition (iv), in other words, if the sum of the thickness $d_5$ of the third lens, thickness $d_7$ of the lens on the object side and thickness $d_8$ of the lens on the image side of the cemented fourth lens, i.e., $d_5 + d_7 + d_8$ is smaller than $0.15f$, favourable correction of the astigmatism cannot be achieved. If the said sum is larger than $0.3f$, the overall length of the lens system becomes large and it is impossible to make the lens system compact. If the total focal length $f_{3,4}$ of the third and fourth lenses does not satisfy the condition (v), that is, when $f_{3,4}$ is smaller than $1.5f$, it becomes difficult to make the back focal length long and to correct the upper oblique ray favourably. If $f_{3,4}$ is larger than $2.5f$, it is undesirable for correction of the spherical aberration and lower oblique ray. The fact to select $r_6$ and $r_7$, radii of curvature of the mutually opposing surfaces of the third and fourth lenses, within the range of the condition (vi) and to make them approximately equal is effective for favourable correction of the coma at the skirt of the image. So, it is possible to obtain excellent quality of image which generally tends to become unfavourable at the skirt of the photograph. If $r_6$ and $r_7$ are not in the range defined by the condition (vi), that is, when $r_6$ and $r_7$ are larger than $f$, the above-mentioned effect cannot be achieved satisfactorily. If they are smaller than $0.5f$, unfavourable influence occurs on correction of the aberration for rays at the circumferential part of the lens when the stop is almost fully opened, and as a result, it is impossible to obtain a large-aperture lens system with the F-number ranging up to F/2. The fact to make the distance $d_{11}$ between the fifth and sixth lenses smaller than $0.1f$ according to the condition (vii) is essential for correction of the coma and distortion. When $d_{11}$ does not satisfy the condition (vii), that is, when $d_{11}$ is larger oblique ray and the negative distortion will increase.

As described in the above, the lens system of the present invention, which satisfies the above-mentioned seven conditions, is capable of composing a large-aperture wide-angle lens system of high performance which is compact in size and has a large aperture ratio of 1 : 2 and field angle ranging up to 64° and for which aberrations are favourably corrected over the whole image as it will become evident also from the detailed description according to the embodiment of the present invention in the following.

DESCRIPTION OF THE PREFERRED EMBODIMENT

Figure 1:
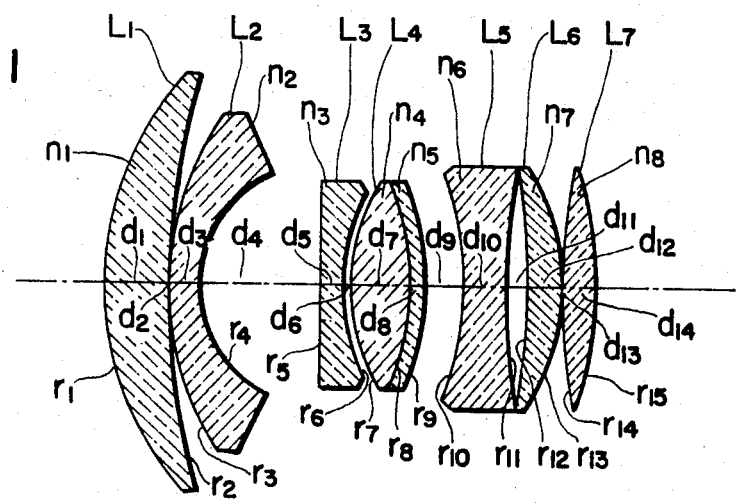
FIG. 1 is a sectional view of the preferred embodiment of the large-aperture wide-angle photographic lens system of the present invention.

FIG. 1 shows a sectional view of the preferred embodiment of the large-aperture wide-angle photographic lens system of the present invention and its constructional data are as given in the table below.

$f=1.0, f_B=1.1338$, aperture ratio 1:2, $2\omega=64°$

| | | | |
|---|---|---|---|
| $r_1 = 0.7781$ | $d_1 = 0.1941$ | | |
| | | $n_1 = 1.7234$ | $\nu_1 = 37.9$ |
| $r_2 = 1.9389$ | $d_2 = 0.0040$ | | |
| $r_3 = 1.0004$ | $d_3 = 0.0639$ | | |
| | | $n_2 = 1.5163$ | $\nu_2 = 64.0$ |
| $r_4 = 0.3198$ | $d_4 = 0.3317$ | | |
| $r_5 = 81.3104$ | $d_5 = 0.0833$ | | |
| | | $n_3 = 1.8052$ | $\nu_3 = 25.4$ |
| $r_6 = 0.7185$ | $d_6 = 0.0157$ | | |
| $r_7 = 0.7053$ | $d_7 = 0.1441$ | | |
| | | $n_4 = 1.8061$ | $\nu_4 = 40.8$ |
| $r_8 = -1.3701$ | $d_8 = 0.0285$ | | |
| | | $n_5 = 1.6990$ | $\nu_5 = 30.1$ |
| $r_9 = -1.9958$ | $d_9 = 0.1347$ | | |
| $r_{10} = -0.8004$ | $d_{10} = 0.1247$ | | |
| | | $n_6 = 1.7174$ | $\nu_6 = 29.5$ |
| $r_{11} = 4.5543$ | $d_{11} = 0.0400$ | | |
| $r_{12} = -1.7400$ | $d_{12} = 0.1110$ | | |
| | | $n_7 = 1.7292$ | $\nu_7 = 54.6$ |
| $r_{13} = -0.5547$ | $d_{13} = 0.0029$ | | |
| $r_{14} = 2.6372$ | $d_{14} = 0.0833$ | | |
| | | $n_8 = 1.6968$ | $\nu_8 = 55.6$ |
| $r_{15} = -1.6010$ | | | |

In the above table, $f$ represents the focal length of the lens system as a whole, $f_B$ represents the back focal length, $\omega$ represents the half-field angle, $r_1$ through $r_{15}$ represent radii of curvature of successive lenses, $d_1$ through $d_{14}$ represent thicknesses of successive lenses and distances between lenses on the axis, $n_1$ through $n_8$ represent the refractive indexes of successive lenses and $\nu_1$ through $\nu_8$ represent Abbe's numbers of successive lenses.

Figure 2:
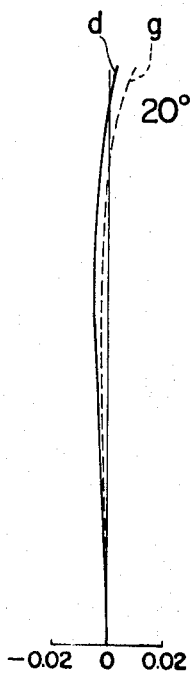
FIG. 2 to FIG. 4 are graphs showing aberration curves of the embodiment shown in FIG. 1.
Figure 3:
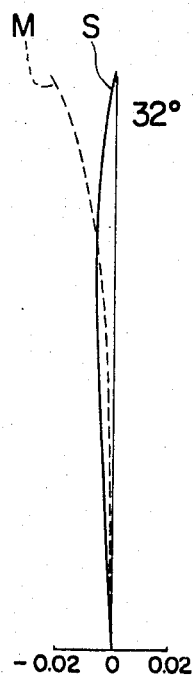
Figure 4:
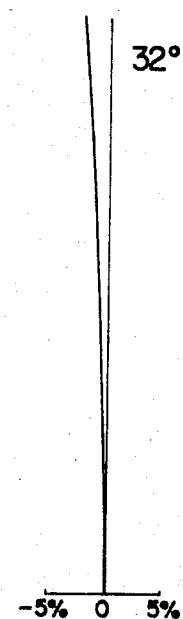

FIGS. 2 to 4 show aberrations of the lens system of the above embodiment: FIG. 2 shows the sperical aberration, FIG. 3 shows the astigmatism and FIG. 4 shows the distortion. As to be clearly understood from the above figure, every aberration of the lens system of the embodiment of the present invention is corrected quite favourably.

I claim:

1. A large-aperture wide-angle photographic lens system consisting of a first lens, a second lens, a third lens, a fourth doublet lens, a fifth lens, a sixth lens and a seventh lens, said first lens being a positive meniscus lens with its convex surface positoned on the object side, said second lens being a negative meniscus lens with its convex surface on the object side, said third lens being negative, said fourth doublet lens being a cemented positive lens, said fifth lens being negative, said sixth lens being a positive meniscus lens with its convex surface on the image side and said seventh lens being positive, and said lens system having the following numerical data:

$f=1.0, f_B=1.1338$, aperture ratio 1:2, $2\omega=64°$

| | | | |
|---|---|---|---|
| $r_1 = 0.7781$ | $d_1 = 0.1941$ | | |
| | | $n_1 = 1.7234$ | $\nu_1 = 37.9$ |
| $r_2 = 1.9389$ | $d_2 = 0.0040$ | | |
| $r_3 = 1.0004$ | $d_3 = 0.0639$ | | |
| | | $n_2 = 1.5163$ | $\nu_2 = 64.0$ |
| $r_4 = 0.3198$ | $d_4 = 0.3317$ | | |
| $r_5 = 81.3104$ | $d_5 = 0.0833$ | | |
| | | $n_3 = 1.8052$ | $\nu_3 = 25.4$ |
| $r_6 = 0.7185$ | $d_6 = 0.0157$ | | |
| $r_7 = 0.7053$ | $d_7 = 0.1441$ | | |
| | | $n_4 = 1.8061$ | $\nu_4 = 40.8$ |
| $r_8 = -1.3701$ | $d_8 = 0.0285$ | | |
| | | $n_5 = 1.6990$ | $\nu_5 = 30.1$ |
| $r_9 = -1.9958$ | $d_9 = 0.1347$ | | |
| $r_{10} = -0.8004$ | $d_{10} = 0.1247$ | | |
| | | $n_6 = 1.7174$ | $\nu_6 = 29.5$ |
| $r_{11} = 4.5543$ | $d_{11} = 0.0400$ | | |
| $r_{12} = -1.7400$ | $d_{12} = 0.1110$ | | |
| | | $n_7 = 1.7292$ | $\nu_7 = 54.6$ |
| $r_{13} = -0.5547$ | $d_{13} = 0.0029$ | | |
| $r_{14} = 2.6372$ | $d_{14} = 0.0833$ | | |
| | | $n_8 = 1.6968$ | $\nu_8 = 55.6$ |
| $r_{15} = -1.6010$ | | | | where $f$ represents the focal length of the lens system as a whole, $f_B$ represents the back focal length, $\omega$ represents the half-field angle, $r_1$ through $r_{15}$ represent radii of curvature of successive lenses, $d_1$ through $d_{14}$ represent thicknesses of successive lenses and distances between lenses on the axis, $n_1$ through $n_8$ represent the refractive indexes of successive lenses and $\nu_1$ through $\nu_8$ represent Abbe's numbers of successive lenses.

* * * * *